T. TEBOW.

Improvement in Machines for Breaking and Cleaning Hemp, Flax, &c.

No. 115,387. Patented May 30, 1871.

2 Sheets--Sheet 1.

Witnesses.
F. W. Howard
A. M. Stout

Inventor
Theodore Tebow

T. TEBOW.
Improvement in Machines for Breaking and Cleaning Hemp, Flax, &c.
No. 115,387. Patented May 30, 1871.
2 Sheets--Sheet 2.
Fig. 3.
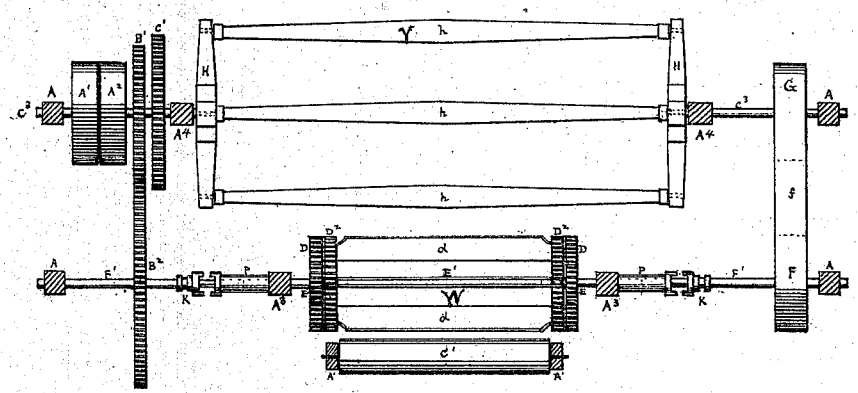
Fig. 4.
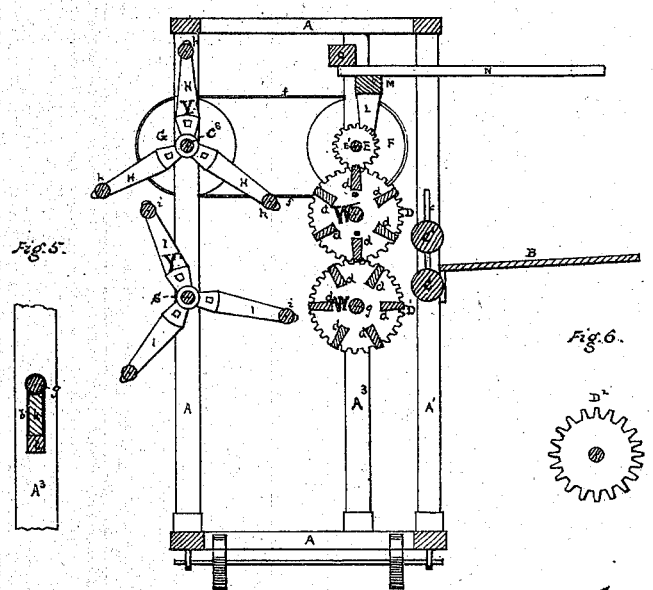
Fig. 5.
Fig. 6.
Witnesses.
F. W. Coward
A. M. Stouts
Inventor
Theodore Tebow

UNITED STATES PATENT OFFICE.

THEODORE TEBOW, OF LEXINGTON, KENTUCKY.

IMPROVEMENT IN MACHINES FOR BREAKING AND CLEANING HEMP, FLAX, &c.

Specification forming part of Letters Patent No. 115,387, dated May 30, 1871.

I, THEODORE TEBOW, of the city of Lexington, in the county of Fayette and State of Kentucky, have invented certain Improvements in Breaks for Breaking Hemp and Flax, of which the following is a specification:

Nature and Objects of the Invention.

The first part of my invention relates to the arrangement of clutches on the main shaft of a hemp and flax break, and of wheels and pulleys, in such a manner that the operator, by means of a lever, may stop or reverse the feeding-action of the breakers at will, so that, when about half the length of a batch of hemp or flax has been broken and cleaned, it may be withdrawn in order to feed the other end of the batch to be operated upon in a similar manner, without stopping the cleaners, hereinafter described. The second part of my invention relates to the arrangement of two beaters on a shaft in the rear of the main shaft so as to clean or swingle the hemp as it is fed to them by the breakers, and so as to act independently, at will, of the breakers themselves. The third part of my invention relates to the combination and arrangement of the principal parts of the whole machine, as hereinafter described.

Description of Accompanying Drawing.

Figure 1:
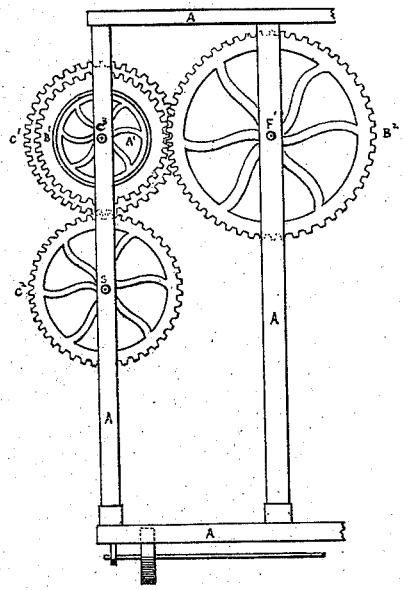
Figure 2:
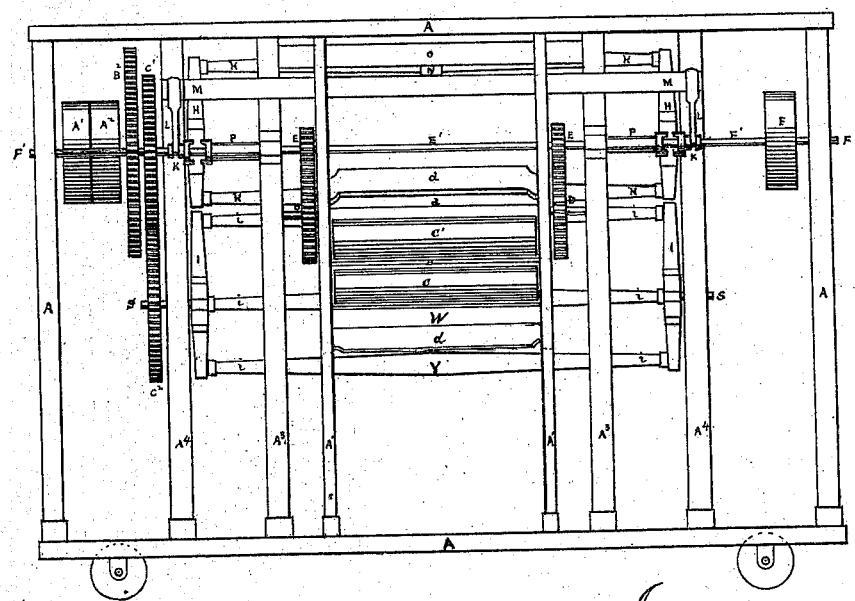

Figure 1 represents an end view of the frame and gearing; Fig. 2, a front elevation; Fig. 3, a plan; Fig. 4, a cross-vertical sectional view of the same. Fig. 5 shows an end view of the bearings of the lower breaker, and Fig. 6 shows an end view of the head-pieces of the breakers.

General Description.

In the drawing, A A represent the frame of the machine; $A^1$, a loose pulley; $A^2$, a fast pulley on the upper shaft $C^3$. By means of the pulley $A^2$ power is communicated to the operative parts, and the loose pulley $A^1$ supports the driving-band when the machine is stopped. The pinions E E are fixed upon the main shaft $E'$, and have cogs, say, a half-inch in length, which mesh with cogs of the same length on the peripheries of the cog-wheels D D, which are fixed on a shaft having its journals in the uprights $A^3 A^3$. On the inner sides of cog-wheels D D, on the same shaft, are the circular head-pieces $D^2 D^2$ of the upper breaker, as shown in Fig. 3. The cogs on the peripheries of these head-pieces are, say, one and a half inch, or three times as long, and these cogs mesh with those of the same length in the similar head-pieces of the lower breaker, and thus motion is given to the latter breaker, which has its journals in the same uprights $A^3 A^3$. A vertical sectional view is given of these breakers, their shafts, head-pieces, and their sword-shaped bars, in Fig. 4. The outer edges of these bars should be about one-eighth of an inch in thickness, and rounded. In the front of them are the table B and the spreading-rollers $c\ c'$, which are loose upon their bearings, and turn by friction as the hemp is fed to the breakers. The upper one, $c'$, moves up and down in the slots $c\ c$, and is adjusted by the operator by means of a treadle, not shown in the drawing, the use of both rollers being to keep the hemp pressed down and equally spread out as it is fed to the breakers. In Fig. 5 is shown an enlarged end view of the journals $g\ g$ of the lower breaker. Immediately under this are the blocks K, which may move up and down in suitable grooves, and rest upon rubber springs $l\ l$, which in this way afford the elastic bearings, hereinafter mentioned, for the lower breaker. These springs, and the long cogs in the head-pieces, together afford the vertical play-room for the lower breaker, hereinafter mentioned. Just behind the breakers W W, and on the same level with them, are the beaters or cleaners Y Y, having bearings for their axles in uprights $A^4 A^4$. They are provided at each end with arms I I I H H H, which may be two or more in number, and in the ends of these are journaled the swingles $h\ h\ h$ $i\ i\ i$, which may be in form round, square, three-cornered, or half round, and are larger at the center than at the extremities, as shown, in order that they may spread the hemp; and they turn freely in their bearings, as and for the purposes before stated. The two beaters revolve in opposite directions, and they are placed so nearly together and so arranged that their arms mesh together without touching each other, so that their swingles shall strike the broken hemp alternately from above and below rapidly, and thus knock out the shives without abrading and entangling the fiber. The main shaft E′ has two sections F′ F′, one turning in each end of it, and the sections may turn without turning it and the breakers, while the beaters or cleaners, on the other hand, turn whenever the power is applied by a band over pulley A². Therefore, in order to turn the main shaft, either the right or left section F′ and its clutch must be engaged.

When it is intended to operate the breakers and break the hem, the left clutch must be engaged; but, on the contrary, when the breakers are to be reversed, the right section and its clutches must be engaged, and then the hemp will be drawn out as the right section is revolved by the band $f$ over the pulleys G and F, in an opposite direction to that of section F′, on the left, which is revolved by cog-wheels B²; and when the clutch on that section is engaged it turns the breakers in opposite directions, and they draw in the hemp from table B. Hence the action of the beaters and cleaners is independent of the breakers, which may be stopped at any moment by disengaging both clutches at the same time, to allow the broken hemp to be more thoroughly beaten by said beaters. The clutches are operated by means of the lever N, and the yokes L L inclosing the beam M at their upper ends, and by their lower ends clasping the sections F′ F′. The sections F′ F′, on the right and left of the breakers, extend into boxes P P to the cross dotted lines at P P, and turn freely therein, so that the main shaft E′ remains at rest, as shown in Figs. 2 and 3, and revolves only when either one of the clutches is engaged. Finally, the bearings of the lower breakers are rendered elastic in order to prevent breakage, as before stated. The breakers have the bearings of their shafts in uprights A³ A³. Just under the shafts in the uprights are pieces of wood or metal capable of being moved up and down, and under them are properly-seated blocks of soft rubber of such thickness as may be required; and, by making the cogs on the head-pieces of the breakers longer than would otherwise be necessary, the lower breaker would yield considerably before it would be out of gear with the cogs of the upper one.

I will here suggest that the teeth on the head-pieces D² D², being longer, will have to be made wider apart than those on the cog-wheels D D; and, further, that the whole machine is made to be moved upon wheels, as shown in the drawing; and, finally, that by means of the fast pulley A² the shaft C² is revolved and turns the cog-wheels B², by which the main shaft E′ and the breakers are turned; and by means of the same pulley A² the cog-wheel C¹ is turned, and it turns the upper cleaner; and the cog-wheel C¹ also turns a similar wheel, C², of the same diameter, on the shaft S, and this latter wheel turns the lower cleaner in an opposite direction to the upper one. A fast pulley, G, is placed on the shaft C³, and a band over it, and a fast pulley, F, secures the reverse motion of the breakers, when the clutch on the left is disengaged and the one on the right is engaged, before mentioned.

Claims.

I claim as my invention—

1. The two breakers W W, in combination with the main shaft E′, the sections F′ F′, the clutches P and K, the pulleys G and F, and shaft C³, when constructed and arranged substantially as as and for the purpose described.

2. In combination with the subject-matter of the above claim, the beaters Y Y, when constructed and arranged to operate substantially in the manner and for the purpose specified and set forth.

3. The machine for breaking hemp and flax herein described, consisting of the breakers W provided with cogged head-pieces D², beaters Y, shafts E′ and C³, clutches P K and their operating mechanism, pulleys A¹ A² F G, gears B¹ B² and C¹ C², and pinions D and E, constructed and arranged substantially as described, and for the purpose set forth.

THEODORE TEBOW.

Witnesses:
JAS. A. LOWNDES,
A. M. STOUT, Jr.